May 21, 1963  J. T. FERRIS ETAL  3,090,379
ILLUMINATED ENDOSCOPE
Filed May 16, 1960

JOHN T. FERRIS
GUSTAV A. ULRICH
INVENTORS

BY *Frank C. Parker*
*Hoffman Stone*
ATTORNEYS 3,090,379
ILLUMINATED ENDOSCOPE
John T. Ferris, Pittsford, and Gustav A. Ulrich, Rochester, N.Y., assignors to Bausch & Lomb Incorporated, a corporation of New York
Filed May 16, 1960, Ser. No. 29,442
3 Claims. (Cl. 128—6)

This invention relates to an improved illumination system for endoscopic and like optical instruments, and, more particularly, to an improved illumination system of this type arranged for directing a relatively large portion of the light emitted from a light source in the general direction of viewing.

One important object of the present invention is to provide an improved illumination system for illuminating the field of view and remote viewing instruments such as endoscopes and the like.

Other objects are: to provide an improved illumination system in an endoscope or like instrument of relatively high efficiency which is capable of providing maximum brilliance and a maximum concentration of light upon the region of interest; to provide an improved illumination system for endoscopic instruments in which a major portion of the light emitted from a light source is confined to the viewing field and directed in the viewing direction so that parallax effects are minimized and maximum illumination is provided in the region of interest regardless of its spacing from the objective lens of the instrument; to provide an illumination system for endoscopic instruments which is relatively compact and requires a minimum amount of space; and to provide an illumination system for a flexible endoscope, which may be housed in a rigid portion of the endoscope along with the optical objective thereof without requiring excessive elongation of the rigid portion.

The foregoing and other objects and advantages of the present invention will become apparent in the following detailed description of representative embodiments thereof, taken in conjunction with the drawing, wherein.

Figure 1:
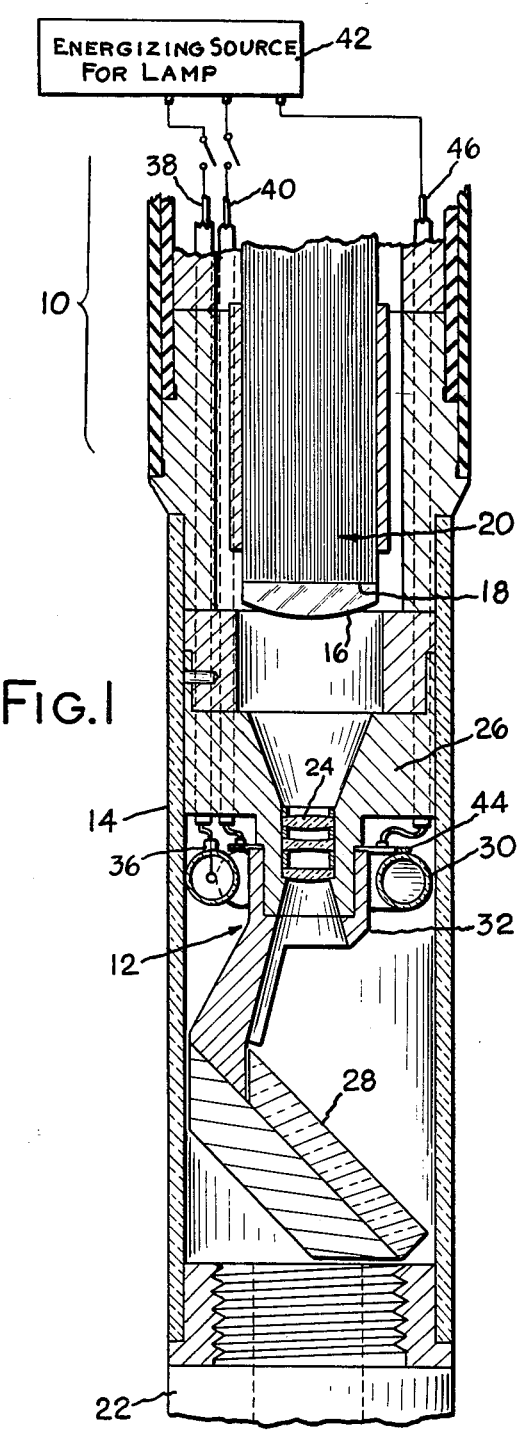
FIG. 1 is a fragmentary, longitudinal sectional view of the front, or objective portion of a flexible endoscope including an illumination system according to a presently preferred embodiment of the invention.

In previous endoscopes, the lamp for illuminating the field of view is usually located in front of the optical objective, thus presenting a parallax problem with respect to viewing objects at different distances from the objective, and also requiring an extension of the rigid housing within which the objective and lamp are ordinarily enclosed. Illumination systems of this type are relatively inefficient, because the light cannot be aimed directly at an object to be viewed, but must be spread out, and sufficient light must be provided to illuminate the entire range of view. The second problem, having to do with elongation of the rigid housing is of particular importance in flexible endoscopes wherein it is desired to minimize the length of each relatively rigid portion thereof in order to permit the endoscope to enter and pass through relatively sharply curved passageways and cavities in the body.

According to the invention, the foregoing disadvantages are effectively overcome by providing a so-called vertical illumination system in an endoscope. One or more lamps are placed immediately adjacent to the objective lens of the endoscope for emitting light in the general direction of the viewing axis. A window is also provided to permit emission of light from the lamp in a radial direction for side lighting and to improve contrast. The major portion of the light is confined largely to the field of view of the objective for illuminating the region of interest without parallax. The arrangement allows the use of a relatively low intensity lamp, while still providing adequate illumination over the entire range of view. Another important advantage is the reduction in the overall length of the housing required for enclosing the objective and the light source, since the lamp may be coextensive with the objective lens thereby requiring no additional housing length.

The practice of the invention is illustrated in the drawing as embodied in an endoscope of the type including an elongated flexible portion 10 for transmitting a light image from a region of interest such as a body cavity or the like to an accessible location for viewing. The endoscope also includes an objective assembly 12 mounted within a relatively rigid cylindrical window 14 at the front of the flexible portion 10. The objective assembly 12 projects an image of the region of interest into a field lens 16, which is cemented upon the front face 18 of a coherent, light transmitting, fiber bundle 20. The field lens 16 directs the image rays into the individual fibers of the bundle 20 for transmission therethrough to the opposite end of the bundle for viewing. A relatively short, soft, and highly flexible finger 22 is fixed at the front of the window 14, and serves to close the window, thereby sealing the objective assembly 12 within the window for protection against the action of body fluids and the like.

The objective assembly 12 includes an objective lens 24, mount 26 for the lens, an inclined mirror 28 positioned in front of the lens 24, and means (not shown) for controllably rotating thet mirror for scanning the field around the window 14.

For illumination purposes a doughnut shaped lamp 30 is positioned directly around the objective lens 24, the lens being shielded from direct rays from the lamp 30 by a cylindrical shield 32. The lamp 30 may conveniently be of the gas discharge type filled with xenon and having a pair of discharge electrodes 34 and 36 which project interiorly into the lamp envelope and are electrically connected to lead wires 38 and 40 respectively. The lead wires 38 and 40 extend rearwardly through the flexible portion 10 of the endoscope for connection to an energization source 42. A trigger voltage is also required for operation of this type of lamp at relatively low voltage energization levels, and is applied between a third electrode 44 and one of the two electrodes 34 and 36. The trigger electrode 44 preferably comprises a metallic ring cemented externally to the lamp 30 and does not project into the interior of the lamp. It is connected to the energization source 42 through a third lead 46, which extends through the flexible portion 10.

In operation, the lamp 30 may be operated at a relatively low energization rate to provide illumination in the field of view. Part of the light emitted by the lamp 30 escapes radially outwardly, directly through the window 14 for general, off axis illumination of the field around the window. A large portion of the light from the lamp 30 escapes generally forwardly from the lamp toward the mirror 28 in the viewing direction of the objective lens 24, and is reflected by the mirror 28, into the field of view. A major portion of the light emitted by the lamp, therefore, enters the field of view within the cone encompassed by the viewing angle of the objective lens 24 and illuminates the entire range of view without variations due to parallax.

The arrangement is relatively efficient, and relatively low level illumination may be used, with a consequent reduction in the size of the lamp required for adequate illumination, and a reduction in heat dissipation in the lamp. Moreover, since the lamp 30 is placed immediately around the objective lens 24, the length of the relatively rigid window 14 may be minimized, because it is not necessary to extend the window to include a light source positioned forwardly of the mirror 28 as was the previous usual practice.

Figure 2:
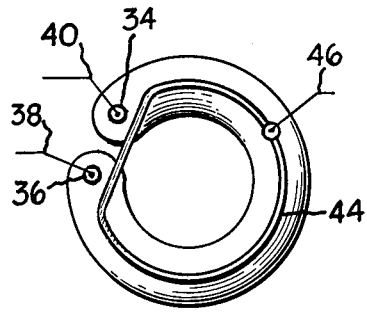
FIG. 2 is a plan view of the lamp shown in the endoscope illustrated in FIG. 1.
Figure 3:
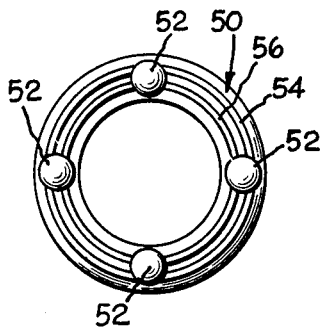
FIG. 3 is a bottom view of a lamp assembly for an endoscope according to a modified form of the invention.
Figure 4:
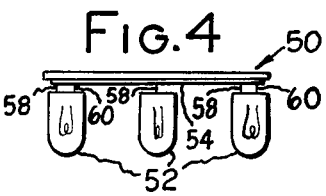
FIG. 4 is an elevational view of the lamp assembly shown in FIG. 3.

The practice of the invention is not limited to use of a doughnut shaped lamp such as the lamp 30 shown in FIGS. 1 and 2, although this shape is presently preferred because it appears to permit maximum light emission from the available space in the endoscope. The invention also contemplates the use of light sources of other types, and of other shapes in place of the doughnut shaped gas discharge lamp 30. One such modification is shown in FIGS. 3 and 4, and includes an annular mounting plate 50 for supporting a plurality (four being illustrated) of sub-miniature incandescent lamps 52 spaced at equal angular intervals therearound. A pair of conductors 54 and 56 may be cemented or otherwise secured upon the surface of the plate 50, which may be of an insulating material such as Micarta, and the leads 58 and 60 of the lamps may be soldered or otherwise connected to the conductors 54 and 56. The mounting annulus 50, with the lamps 52 secured thereto may be used in place of the lamp 30 in the endoscope shown.

Certain other features of the endoscope illustrated in the drawing are described and claimed in the following co-pending applications for Letters Patent of the United States:

Gilbert J. Sheldon, Ser. No. 679,566, filed August 22, 1957, entitled "Flexible Tube Structures," and now Patent No. 3,060,972.
Gilbert J. Sheldon, Ser. No. 686,320, filed September 26, 1957, entitled "Optical Viewing Instrument," and now Patent No. 2,975,785.
Gilbert J. Sheldon, Ser. No. 715,820, filed February 17, 1958, entitled "Optical System for Endoscopes and the Like," and now Patent No. 2,987,960.
Gilbert J. Sheldon, Ser. No. 815,387, filed May 25, 1959, entitled "Illumination Means for Diagnostic Instrument," and now Patent No. 3,042,022.
Gilbert J. Sheldon et al., Ser. No. 29,416, filed concurrently herewith, entitled "Focusing Endoscope."
John T. Ferris et al., Ser. No. 29,264, filed concurrently herewith, entitled "Duodenoscope," and now Patent No. 3,057,345.
Gustav A. Ulrich, Ser. No. 29,255, filed concurrently herewith, entitled "Holder for Camera and Viewing Device."
John T. Ferris et al., Serial No. 29,417, filed concurrently herewith, entitled "Improved Endoscope Illumination."
Gustav A. Ulrich, Ser. No. 29,443, filed concurrently herewith, entitled "Bi-Directionally Flexible Segmented Tube."

What is claimed is:
1. An endoscope comprising in combination, an elongated tube, objective lens means in the forward end of said tube, a light source located concentrically around said lens means for radiating light through 360°, a peripheral window mounted on the forward portion of said tube enclosing said light source, an intermediate wall separating said light source from said objective lens means and preventing the direct radiation of said light source from radiating on said objective lens means, and reflector means mounted within said window adjacent said objective lens means and axially rotatable relative to said window for directing a reflective illuminated objective image through said lens means.

2. An endoscope as defined in claim 1 in which said light source is an annular bulb.

3. An endoscope as defined in claim 1 in which said light source is a plurality of lamps.

References Cited in the file of this patent
UNITED STATES PATENTS

| 300,525 | Starr | June 17, 1884 |
|---|---|---|
| 556,693 | Quimby | Mar. 17, 1896 |
| 728,589 | Levi | May 19, 1903 |
| 2,843,112 | Miller | July 15, 1958 |
| 2,877,368 | Sheldon | Mar. 10, 1959 |
| 2,932,294 | Fourstier et al. | Apr. 12, 1960 |

FOREIGN PATENTS

| 23,821 | Great Britain | 1901 |
|---|---|---|
| 158,149 | Great Britain | Feb. 3, 1921 |